Figure 1:
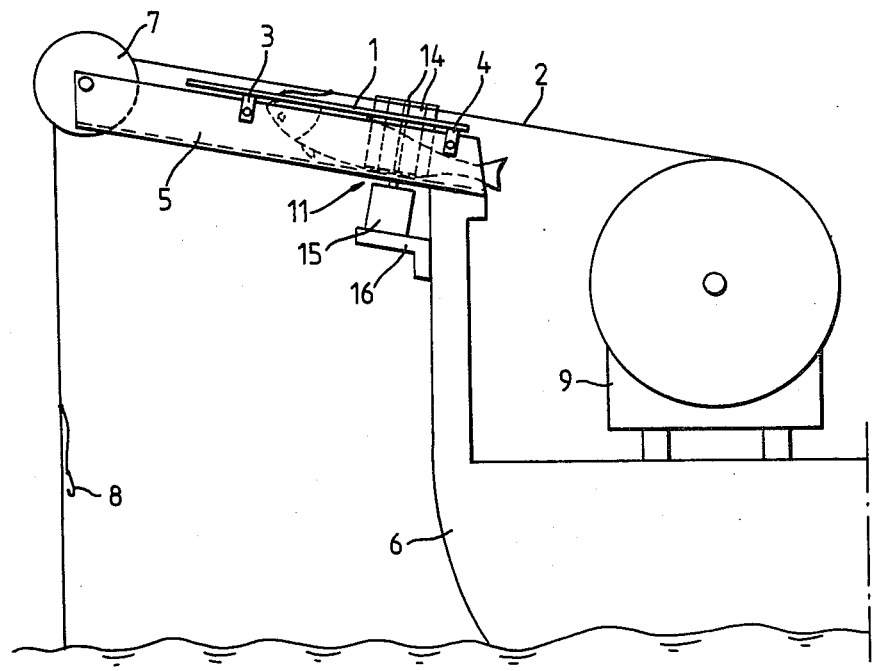

United States Patent [19]
Christiansen

[11] 4,359,835
[45] Nov. 23, 1982

[54] APPARATUS FOR DETACHING FISHES FROM FISH-HOOKS ON A FISHING LINE

[76] Inventor: Thorbjörn N. Christiansen, Vesteralsgt. 1, N-8400 Sortland, Norway

[21] Appl. No.: 223,060

[22] Filed: Jan. 7, 1981

[30] Foreign Application Priority Data

Jan. 17, 1980 [NO] Norway ................................. 800103

[51] Int. Cl.³ ...................... A01K 91/06; A01K 79/00
[52] U.S. Cl. ........................................ 43/6.5; 43/27.4
[58] Field of Search ..................... 43/4, 4.5, 6.5, 27.4

[56] References Cited
U.S. PATENT DOCUMENTS 3,841,011  10/1974  Itson ........................................ 43/4
4,266,359   5/1981  Alex ....................................... 43/6.5
4,312,147   1/1982  Christiansen ..................... 43/27.4 X Primary Examiner—Nicholas P. Godici
Assistant Examiner—M. Jordan
Attorney, Agent, or Firm—Sughrue, Mion, Zinn, Macpeak and Seas

[57] ABSTRACT

An apparatus for detaching fishes from fish-hooks on a fishing line during hauling of the line comprises a guiding means (1) disposed below the fishing line (2) and having a guiding edge (10) forming an acute angle with the line (2) in the hauling direction thereof and causing arriving fish-hooks (8) to slide along the guiding edge when passing the apparatus, and a detachment means (11) cooperating with the guiding means (1) for detaching fishes hanging on the hooks (8) when arriving at the guiding means (1).

5 Claims, 2 Drawing Figures

APPARATUS FOR DETACHING FISHES FROM FISH-HOOKS ON A FISHING LINE

The present invention relates to an apparatus for detaching fishes from fish-hooks on a fishing line during hauling of the line.

In connection with e.g. jigging or bobbing type of fishing or line fishing on fishing vessels it has traditionally been necessary in connection with hauling of the fishing line that a special person takes care of the task of loosening or detaching the catch from the fish-hooks. The purpose of the present invention is, however, to provide a simple and effective apparatus which can provide for automatic detachment of hanging fish from the fish-hooks, so that an increased efficiency and rationalisation of the fishing is achieved.

According to the invention this purpose is achieved in that the apparatus comprises a guiding means disposed below the fishing line and having a guiding edge forming an acute angle with the line in the hauling direction thereof and causing arriving fish-hooks to slide along the guiding edge when passing the apparatus, and a detachment means cooperating with the guiding means for detaching fishes hanging on the hooks when arriving at the guiding means.

An advantageous embodiment of the invention is characterized in that the detachment means comprises a rotatable body provided with a plurality of projections and adapted, by rotation, to give a fish, which is moved along the guiding means, a push in the hauling direction of the line, to thereby detach the fish from the hook.

Figure 2:
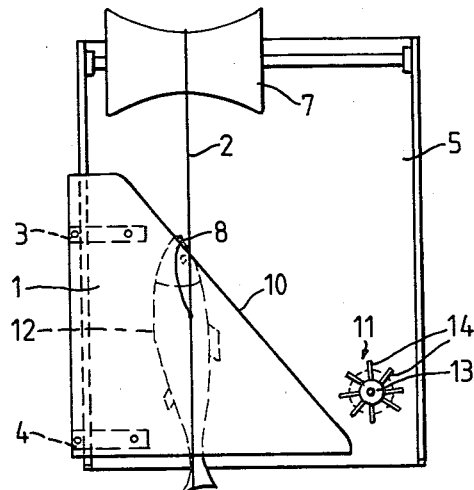

The invention will be more closely described below in connection with an exemplary embodiment with reference to the accompanying drawing, wherein:

FIG. 1 shows a schematical side view of an apparatus according to the invention mounted on a partly shown fishing vessel, and FIG. 2 shows the apparatus in FIG. 1 viewed from above.

In the embodiment shown in the drawing the guiding means of the apparatus consists of an essentially horizontally disposed plate 1 which may e.g. be made of steel and which is mounted below a fishing line 2 by means of a pair of supports 3, 4. At their lower ends the supports are attached to a tilted chute 5 which is in turn attached on the rail of a fishing vessel 6 in order to receive catch falling into the chute and transfer the catch to boxes or the like on the vessel. At the upper end of the chute 5 there is rotatably mounted a reel-shaped line-guiding roller 7 over which the fishing line 2 is running and over which also the fish-hooks 8 of the line and possible catch are passing during hauling of the line. The line is let out and hauled by means of e.g. a capstan or an automatic fishing machine which is schematically shown at 9.

The guiding plate 1 has a guiding edge 10 facing the line guiding roller 7 and forming a suitable acute angle (e.g. ca. 45°) to the line 2 in the hauling direction thereof. During hauling of the line the hooks 8 with possible hanging fish will slide along the guiding edge 10 in the direction towards the free end of the guiding plate 1 which end may advantageously be rounded as shown. Generally the force of gravity will cause that the hooks of the fish-hooks are turned downwards, so that also fish-hooks without fish will come into engagement with the guiding edge and slide along the edge.

A fish which does not loosen from the hook by itself when it comes into abutment against the guiding means, is moved towards a detachment means which is generally designated by the reference numeral 11 and comprises a rotatable body which has a plurality of projections and is adapted, by rotation, to give a fish 12 moved along the guiding means a push in the hauling direction of the fishing line 2, so that the fish is loosened or detached from the hook and falls into the chute 5. In the illustrated embodiment the detachment means comprises a cylindrical roller 13 which is provided with a plurality of axially extending vanes 14 and which is rotatable about an essentially vertical axis by means of a separate driving motor 15. The driving motor, which may e.g. be of electric or hydraulic type, in the illustrated example is supported on the chute 5 or the vessel 6 through a base 16. A separate driving means is preferable for the detachment means, even if it may also be contemplated to be driven through a suitable transmission from the line guiding roller 7 or from a capstan or a fishing machine. The vanes may be radially projecting on the roller, but are somewhat tilted in the exemplary embodiment so that they are inclined forwards in the rotational direction of the roller.

It will be appreciated that the apparatus according to the invention may be varied to a substantial degree with regard to structural design, both with respect to the guiding means and with respect to the detachment means, and also with respect to the individual and relative orientation and location of the various elements. As regards the guiding means, this may in an alternative, simple embodiment consist of an essentially horizontally disposed rod forming said acute angle to the fishing line and having a round cross-section with a diameter which is somewhat less than the opening of the fish-hook, so that is provides a guidance for the fish-hook corresponding to that of the guiding edge on the plate-shaped guiding means.

I claim:

1. An apparatus for detaching fishes from fish-hooks on a fishing line during hauling of the line, characterized in that it comprises a guiding means (1) disposed below the line (2) and having a guiding edge (10) forming an acute angle with the line in the hauling direction thereof and causing arriving fish-hooks (8) to slide along the guiding edge when passing the apparatus, and a detachment means (11) cooperating with the guiding means (1) for detaching fishes hanging on the hooks (8) when arriving at the guiding means.

2. An apparatus according to claim 1, characterized in that the detachment means (11) comprises a rotatable body (13) provided with a plurality of projections (14) and adapted, by rotation, to give a fish, which is moved along the guiding means (1), a push in the hauling direction of the line (2), to thereby detach the fish from the hook (8).

3. An apparatus according to claim 2, characterized in that the rotatable body is a roller (13) having a plurality of projecting vanes (14) and being arranged to rotate about a normally essentially vertical axis by means of a driving means (15).

4. An apparatus according to claim 2, characterized in that the guiding means comprises an essentially horizontally disposed plate (1) of which one edge (10) forms said guiding edge.

5. An apparatus according to claims 1, 2, 3 or 4 characterized in that the guiding means is mounted above a chute (5) arranged below the fishing line (2) for receiving fishes (12) falling down after detachment from the hooks (8).

* * * * *